UNITED STATES PATENT OFFICE.

SUTTON BENDLE, DONALD INNES SMITH, AND THOMAS BEZLY HOUGHTON THORNE, OF LONDON, ENGLAND, ASSIGNORS TO BENDLE'S MEAT PORT SYNDICATE LIMITED, OF LONDON, ENGLAND.

NOURISHING ALCOHOLIC BEVERAGE AND PROCESS OF MANUFACTURING THE SAME.

996,199.     Specification of Letters Patent.     Patented June 27, 1911.

No Drawing.     Application filed August 3, 1908. Serial No. 446,675.

*To all whom it may concern:*

Be it known that we, SUTTON BENDLE, DONALD INNES SMITH, and THOMAS BEZLY HOUGHTON THORNE, subjects of the King of Great Britain, and residents of London, England, (whose post-office address is 148 Sloane street, London, England,) have invented certain Improvements in Nourishing Alcoholic Beverages and Processes of Manufacturing the Same, of which the following is a specification.

This invention consists of a new or improved preparation of a nourishing wine or alcoholic fluid, in which a hydrolyzed or digested preparation of albumin or other protein is added to a still alcoholic fluid, as described hereinafter, the product resulting therefrom being clear, and practically free from sediment.

The object of the present invention is broadly to obtain a nourishing stimulant in the form of a beverage, this being done by adding a nutrient (for example, digested meat powder) to a stimulant (for example, wine).

A further object is to obtain this beverage in the form of a clear, transparent fluid, and to avoid the presence therein (apart from the usual sediment) of pieces of solid matter, which would impart an objectionable appearance to the product.

Such a beverage has not been obtained before, the previous practice, so far as it relates to our invention, consisting in the addition of a meat extract (which is a stimulant but not a nutrient) to wine (itself a stimulant) the result being to obtain at the best a double stimulant, though this is doubtful, for repeated analyses of products so obtained have failed to reveal any appreciable amount of the extract. According to the present invention however the albumin or protein substance remains in solution in the fluid, where its presence can be detected, if desired, by chemical analysis. Furthermore the resulting product has the advantage of being permanent, and presents moreover, both the stimulating properties of a genuine wine and the nourishing qualities of the added hydrolyzed or digested preparation.

With reference to our said invention, the preparation aforesaid should contain either albumose, peptone, syntonin, acid or alkali-albumin (similar to that produced in gastric digestion), or it may be a powder containing one or more of these substances, and we preferably use a meat powder for our purpose. This is added to the still wine or other suitable still alcoholic fluid in the manner described hereinafter. Although almost any kind of still alcoholic fluid or still wine is suitable for our purpose, we prefer to employ port, sherry, Madeira or other such wines which have sufficient alcoholic strength to keep without deteriorating.

In order to clearly describe our process, we will refer to a particular example, although the quantity or proportions of the various constituents may be varied, and will of course depend upon requirements. For instance, we may take half an ounce of meat powder consisting of or containing one or more of the above-mentioned substances, and we add to it normal or neutral tartrate of potassium, in sufficient quantity as will neutralize or partly neutralize or remove (determinable by experiment) the fixed ("nonvolatile") acid (chiefly tartaric acid and tannin in the case of wines) of ten ounces of the still wine which is subsequently added. The mixture of meat powder and neutral tartrate of potassium is made into a consistent paste by adding a little water and stirring thoroughly. Then, after a while, the still wine to be treated is poured on in small quantities at a time, stirring after each addition until the whole ten fluid ounces is added; the fluid is kept stirred until as much meat substance as possible is dissolved, and is then allowed to rest, and the wine decanted or filtered so that it is quite bright. Under this treatment the wine takes up a definite proportion of nutritive substance, according to the quantities of wine and meat substance used, which will remain permanently in solution.

Instead of using neutral tartrate of potassium to neutralize the fixed acid, we may employ the citrate or malate of potassium: or any other suitable substance might be employed for the purpose such as an alkali or an alkaline earth.

We claim:—

1. A process for the production of a nourishing alcoholic fluid, consisting in mixing together a hydrolyzed or digested preparation of a protein, a suitable proportion of a substance adapted to neutralize the fixed acid in the alcoholic fluid, and a suitable proportion of a still alcoholic fluid, allowing the mixture to rest, and finally drawing off the said fluid together with as much of the substance as is dissolved, substantially as described.

2. A process for the production of a nourishing alcoholic fluid, consisting in mixing together a hydrolyzed or digested preparation of albumin, a suitable proportion of a substance adapted to neutralize the fixed acid in the alcoholic fluid, and a suitable proportion of a still alcoholic fluid, allowing the mixture to rest, and finally drawing off the said fluid together with as much of the substance as is dissolved, substantially as described.

3. A process for the production of a nourishing alcoholic fluid, consisting in mixing into a consistent paste a hydrolyzed or digested preparation of albumin together with a suitable proportion of tartrate of potassium adapted to neutralize the fixed acid in the alcoholic fluid subsequently added, then pouring on a still alcoholic fluid in small quantities and agitating the liquid after each addition, allowing the mixture to rest and finally drawing off the said fluid together with as much of the substance as is dissolved, substantially as described.

4. A process for the production of a nourishing alcoholic fluid, which consists in mixing together a meat powder containing albumose, peptone, a digested form of albumin, and syntonin, with a suitable proportion of a substance adapted to neutralize the fixed acid in the alcoholic fluid which is subsequently added, then pouring on a still alcoholic fluid and allowing it to dissolve as much of the substance as it can take in solution, and finally drawing off the said fluid together with as much of the substance as is dissolved, substantially as described.

5. A nourishing alcoholic beverage composed of a nutrient and a stimulant, said nutrient consisting of a hydrolyzed or digested preparation of a protein, and said stimulant consisting of a still alcoholic fluid, the product being a clear, transparent fluid, substantially as described.

6. A nourishing alcoholic beverage composed of a nutrient and a stimulant, said nutrient consisting of a hydrolyzed or digested preparation of albumin, and said stimulant consisting of a still alcoholic fluid the product being a clear, transparent fluid, substantially as described.

7. A nourishing alcoholic beverage composed of nutrients and a stimulant, said nutrients consisting of albumose, peptone, a digested form of albumin, and syntonin, and said stimulant consisting of a still alcoholic fluid the product being a clear, transparent fluid, substantially as described.

8. A nourishing alcoholic beverage composed of nutrients and a stimulant, said nutrients consisting of albumose, peptone, a digested form of albumin, and syntonin, and said stimulant consisting of a still wine, the product being a clear, transparent fluid, substantially as described.

In testimony whereof we affix our signatures in presence of two witnesses.

SUTTON BENDLE.
DONALD INNES SMITH.
THOMAS BEZLY HOUGHTON THORNE.

Witnesses:
ARTHUR H. STANLEY,
A. L. ANNISON.

Copies of this patent may be obtained for five cents each, by addressing the "Commissioner of Patents, Washington, D. C."